G. WILLIAMS.
LOCK JOINT.
APPLICATION FILED NOV. 23, 1914.
1,166,872.
Patented Jan. 4, 1916.
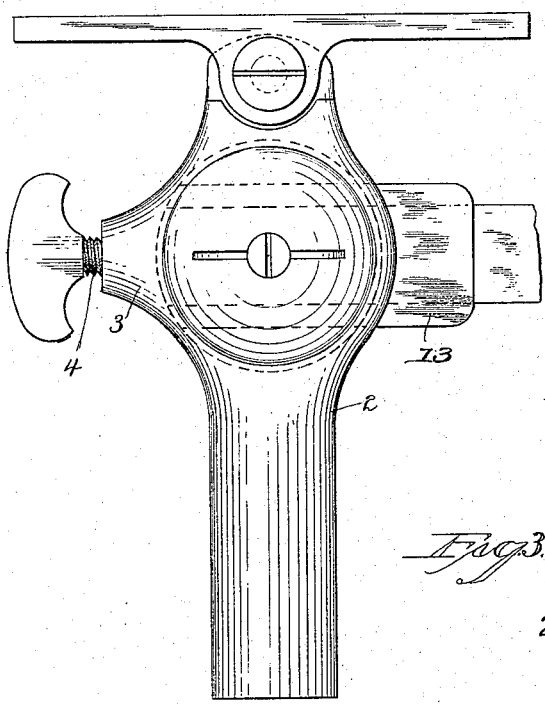
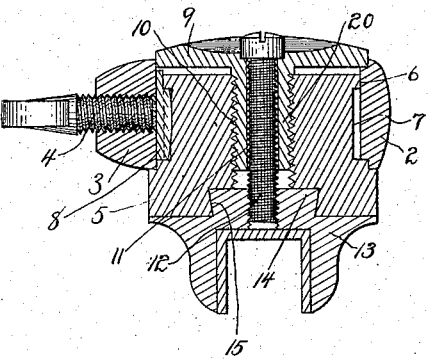
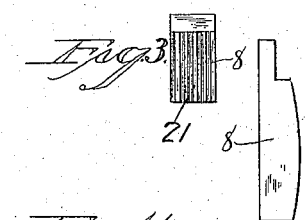
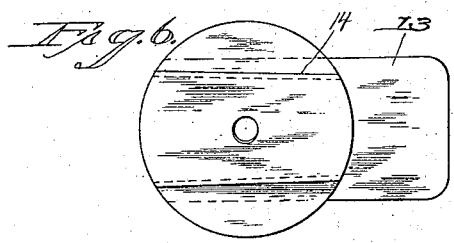
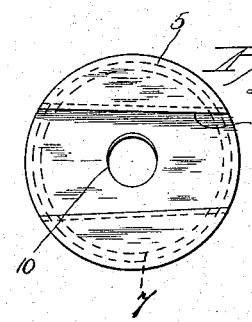
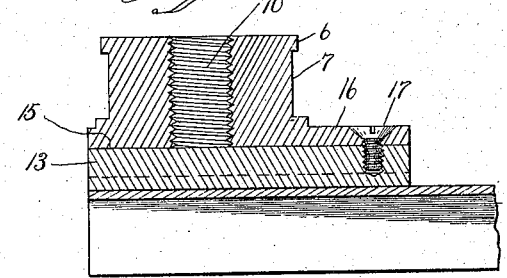
Witnesses
M. P. Nichols
C. L. Weed
Inventor
Gordon Williams
by
Seymour & Earle
attys.

UNITED STATES PATENT OFFICE.

GORDON WILLIAMS, OF NEW HAVEN, CONNECTICUT, ASSIGNOR TO THE ENGLISH & MERSICK CO., OF NEW HAVEN, CONNECTICUT, A CORPORATION.

LOCK-JOINT.

1,166,872.  Specification of Letters Patent.  Patented Jan. 4, 1916.

Application filed November 23, 1914. Serial No. 873,567.

*To all whom it may concern:*

Be it known that I, GORDON WILLIAMS, a citizen of the United States, residing at New Haven, in the county of New Haven and State of Connecticut, have invented a new and useful Improvement in Lock-Joints; and I do hereby declare the following, when taken in connection with the accompanying drawings and the characters of reference marked thereon, to be a full, clear, and exact description of the same, and which said drawings constitute part of this application, and represent, in—

Figure 1 a side view of a lock joint constructed in accordance with my invention. Fig. 2 a transverse sectional view of the same. Fig. 3 a face view of the dog, detached. Fig. 4 an end view of the same. Fig. 5 an edge view of the same enlarged. Fig. 6 a face view of the frame 13 which supports the wind shield-glass frame. Fig. 7 an inside face view of the hub member. Fig. 8 a sectional view of a modified form of my invention.

This invention relates to an improvement in lock joints particularly adapted for holding wind shields for automobiles in various positions of adjustment, the object of the invention being to provide simple means by which a very firm engagement may be made between an adjustable wind shield and its supporting frame, and also to provide means for conveniently removing the wind shield when necessary; and the invention consists in the construction hereinafter described and particularly recited in the claim.

In carrying out my invention, I employ the usual support 2 which is formed on one side with an outwardly projecting lug 3 which is internally threaded to receive a thumb screw 4. This support is formed with a central recess into which the screw extends. The wind shield frame 5 is formed with a round hub 6 having an annular groove 7 into which extends a locking dog 8 the face of which is curved corresponding to the circumference of the groove in the hub and provided with locking teeth 21. This dog is also made convex lengthwise so as to have a rocking motion when engaging the hub, and it is located in line with the screw 4 so as to be forced inward thereby. By making the face of the dog convex lengthwise, it is more readily forced into the casing, having a certain amount of rocking movement so that it will gradually work its way into gripping contact, which would not be easy were the face straight. The hub is held in the frame by a screw 20 having a large cap head 9 the screw entering a threaded opening 10 formed for it in the hub. This screw is also formed with a longitudinal opening 11 through which a screw 12 may be passed, the inner end of the screw engaging with a frame 13 for the windshield glass, and it is to be noted that this wind shield-glass frame is formed with a dovetail rib 14 engaging with a dovetail recess 15 in the frame 5 and preferably these dovetail ribs and recesses will be longitudinally tapered. By this construction the frame holding the glass of the wind shield may be removed without separating the parts as is now necessary in order to remove the hubs from the supports. It is obvious that the frame for the glass of the wind shield might be secured in some other way than by the screw 12. Thus, in Fig. 8 I have shown the hub formed with a downward projection 16 through which a screw 17 may be passed into the frame 13. In either case the glass frame may be readily removed when necessary without separating the hub from the supporting frame.

I claim:—

A lock joint comprising a supporting member formed with a recess and a hub member adapted to enter said recess, a screw entering said recess through one side of the support, and a dog in the path of said screw and adapted to be forced thereby into engagement with said hub, the face of the dog being convex lengthwise and curved transversely.

In testimony whereof, I have signed this specification in the presence of two subscribing witnesses.

GORDON WILLIAMS.

Witnesses:
HARRIETT FAULL WILLIAMS,
GEORGE W. FINK.

Copies of this patent may be obtained for five cents each, by addressing the "Commissioner of Patents, Washington, D. C."